United States Patent [19]

Clausen et al.

[11] Patent Number: 5,410,855
[45] Date of Patent: May 2, 1995

[54] METHOD OF JOINING STRUCTURAL MEMBERS, PROFILE MEMBER AND STRUCTURAL UNIT COMPRISING A PLURALITY OF PROFILE MEMBERS

[75] Inventors: Edvin L. Clausen, Tonder; Peter Gundlach, Bylderup Bov, both of Denmark

[73] Assignee: Norsk Hydro a.s., Oslo, Norway

[21] Appl. No.: 90,167

[22] PCT Filed: Jan. 29, 1992

[86] PCT No.: PCT/NO92/00018

§ 371 Date: Jul. 23, 1993

§ 102(e) Date: Jul. 23, 1993

[87] PCT Pub. No.: WO92/14006

PCT Pub. Date: Aug. 20, 1992

[30] Foreign Application Priority Data

Jan. 31, 1991 [NO] Norway .................. 910381

[51] Int. Cl.⁶ .................................... E04B 1/60
[52] U.S. Cl. .................... 52/747; 52/592.1; 52/592.4; 52/271
[58] Field of Search ............ 52/747, 592.1, 592.2, 52/592.3, 592.4, 592.5, 266, 271, 127.1, 127.7

[56] References Cited

U.S. PATENT DOCUMENTS

| | | | |
|---|---|---|---|
| 3,077,703 | 2/1963 | Bergstrom | 52/592.4 X |
| 3,411,261 | 11/1968 | Soddy . | |
| 3,460,304 | 8/1969 | Braeuninger et al. . | |
| 3,741,593 | 6/1973 | Toti . | |
| 3,760,548 | 9/1973 | Sauer et al. | 52/592.1 |

FOREIGN PATENT DOCUMENTS

| | | | |
|---|---|---|---|
| 1140330 | 11/1962 | Germany . | |
| 2163583 | 7/1973 | Germany . | |
| 2510211 | 7/1978 | Germany . | |
| 3302105 | 7/1983 | Germany | 52/592.2 |
| 1438599 | 6/1976 | United Kingdom | 52/592.2 |

Primary Examiner—Lanna Mai
Attorney, Agent, or Firm—Wenderoth, Lind & Ponack

[57] ABSTRACT

Structural members are extruded with respective abutted edge portions having a transverse cross-sectional configuration complementarily shaped with locking tabs and undercut recesses. The tabs of a first member are interconnected by a unitary transversely extending and inwardly arcuate web. Such web is permanently deformed in a joining process by a deformation tool forcing the outwardly projecting tabs into locking engagement with the second member.

7 Claims, 5 Drawing Sheets

METHOD OF JOINING STRUCTURAL MEMBERS, PROFILE MEMBER AND STRUCTURAL UNIT COMPRISING A PLURALITY OF PROFILE MEMBERS

BACKGROUND OF THE INVENTION

The present invention relates to a method of joining profiled members into structural units, and more specifically to an improved snap type connection method, members employed in such method and resulting structural units provided by such method.

The so-called snap connection principle has been known and employed for several decades now to build larger structural units like panels, side boards, etc. DE 1,140,330 discloses one embodiment of such structural unit based on a resilient interlocking of abutting complementarily shaped edges of connected members by means of projecting tabs and engaging recessing grooves, respectively. Additionally, a loose fit locking bar is inserted extend transversely inwardly between the frictionally engaged resilient tabs to secure the connection against unlocking.

However, in the case of exposure to larger loads or forces it is often necessary and customary to employ some further connection principle such as e.g., screwing/bolting, (spot) welding or gluing. Different drawbacks are inherent with the use of such connecting methods, such as local material weakening due to perforating and temporary heating of members, or in the case of gluing there are rather strict. requirements to clean surfaces and considerable drying/curing time is involved. Generally, these methods are characterized as complex and time-consuming, something which influences negatively the cost of joining.

SUMMARY OF THE INVENTION

It is therefore a principal object of the present invention to provide a new method of joining profiled members avoiding the above difficulties and resulting in simple and strong connections based solely on mutual interlocking engagement of the members.

This and other objects are achieved by provision of suitable special profiled members and a new method of joining as as discussed in detail below.

BRIEF DESCRIPTION OF THE DRAWINGS

The invention will now be described in detail in connection with preferred embodiment(s) referring to the accompanying drawings, wherein.

DETAILED DESCRIPTION OF THE INVENTION

Figure 1:
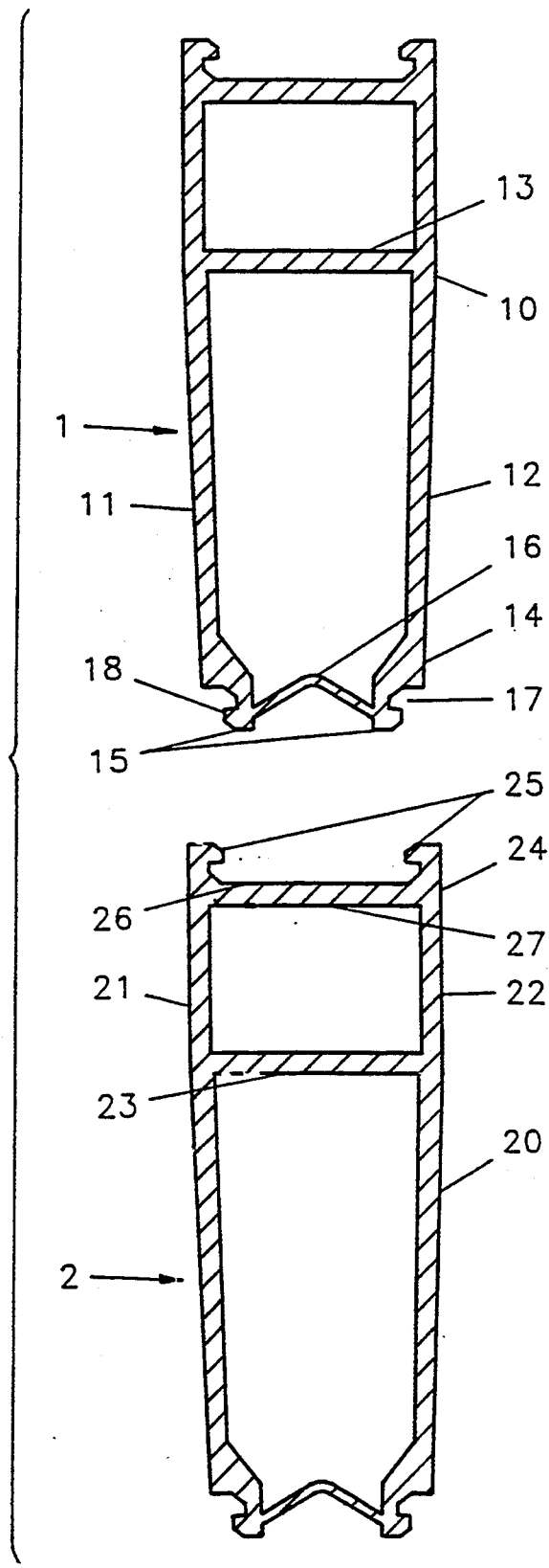
FIG. 1 shows schematically in a cross-sectional view a configuration of abutting edge regions of two profiled members to be joined.

Referring to FIG. 1, basic profiled members 1,2 are shown in transversal cross-section as elongated hollow shapes extruded of light metal material, e.g. aluminum or Al-alloy, having central portions 10,20 reinforced by transverse partition walls 13,23 and longitudinally extending edge portions 14,24 being mutually complementarily shaped to ensure an interlocking connection between the members when abutted and forced into engagement. The edge portion 14 of the first member 1 is provided with two parallel longitudinally extending ribs 15 terminating slightly converging walls 11,12 defining the central portion 10 of the member 1. The ribs 15 are configurated as lateral undercut recesses 17 in the shape walls 11,12 and adjacent outwardly protruding tabs 18.

The edge portion 24 of the second member 2 orientated in facing relation to the edge portion 14 of the first member is provided with locking tabs 25 transversely projecting into a slot 26 defined by a transverse wall 27 connecting the substantially parallel walls 21,22 of the central portion 20.

The ribs 15 are further integrally connected to each other by a transversely extending web 16 that is co-extruded with a length larger than the perpendicular distance between the ribs and illustrated as a V-shaped transverse web having reduced wall thickness compared to the wall thickness of the edge portion and ribs.

Figure 2:
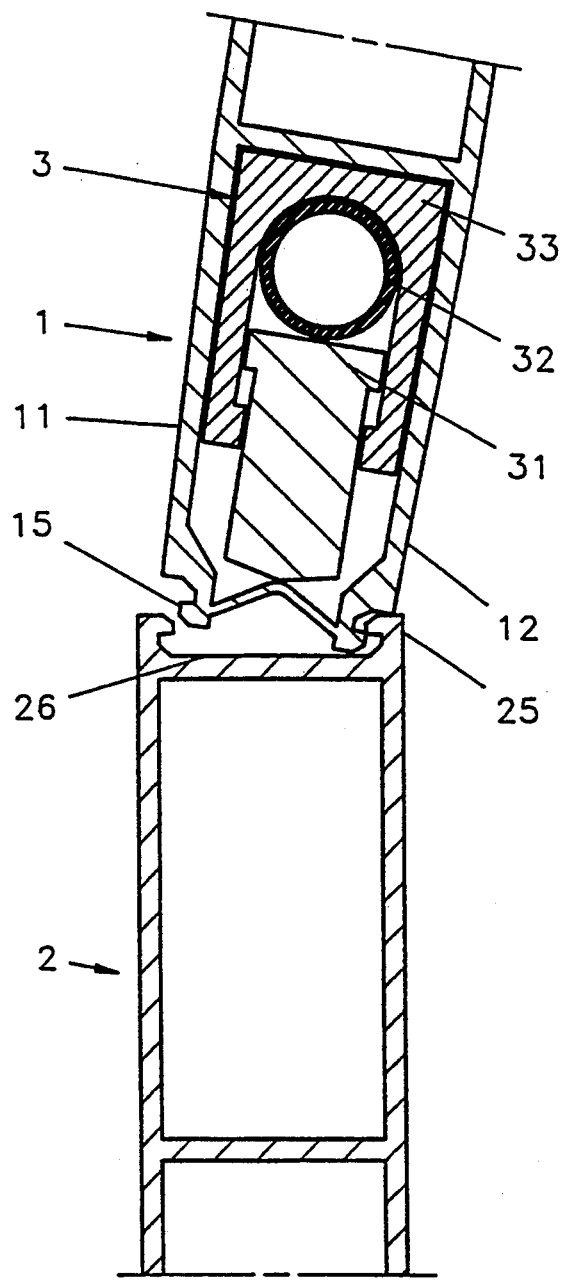
FIG. 2 illustrates schematically a first step of a joining process.
Figure 3:
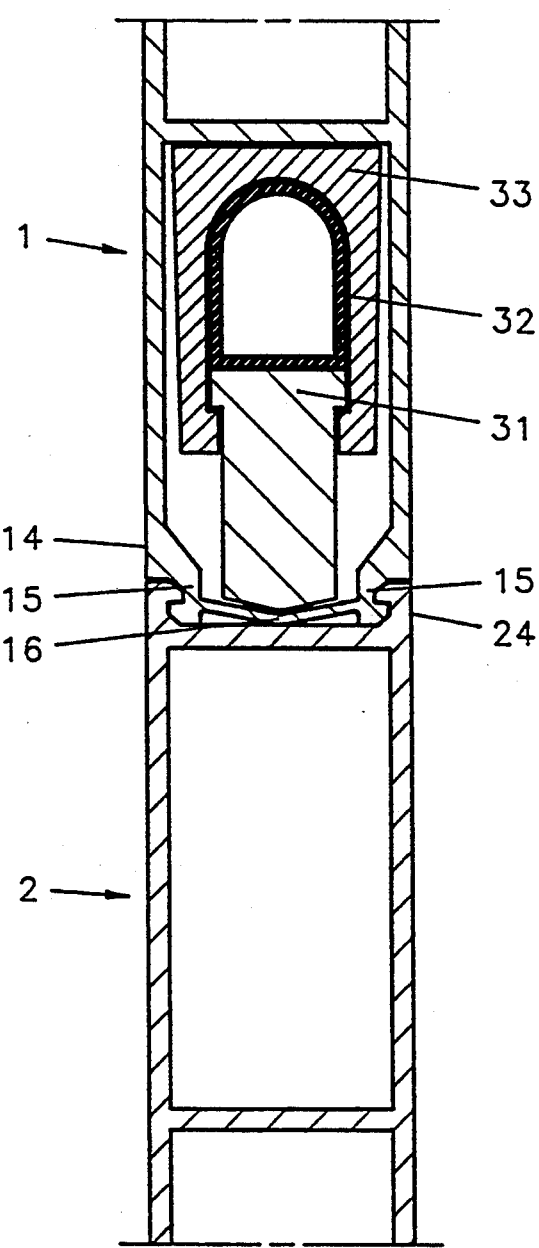
FIG. 3 illustrates a subsequent joining step and the resulting connection between the profiled members.

The reasons for providing the first member 1 with slightly converging walls 11,12 will be apparent from FIG. 2 illustrating a first step of a joining process. As a result of extensive investigations it has been found that in order to ensure a strong connection between the members care must be taken to avoid/minimize the creation of any substantial friction between the respective edge portions during the joining operation. Consequently, according to the present invention the converging walls 11,12 allow an interference-free insertion of the ribs 15 into the slot 26 of the second member 2. A deformation tool shown as an expansion tool 3 comprising a mandrel 31 activated by an expanding member 32 is accommodated in a holder 33 adapted to and inserted into the cavity of the first member. This arrangement allows the use of the first member itself as a dolly in the following deformation of the transverse V-shape web 16 as illustrated in FIG. 3.

The expanding member 32, e.g. a hydraulically or pneumatically operated hose, is expanded into firm contact with the surrounding walls of the holder 33 and mandrel 31 and exerts pressure on the mandrel 31 and thus causing a gradual deformation (flattening) of the web 16 under the successive vertical movement of the mandrel 31 towards the web. At the maximum predetermined extension (stroke) of the mandrel 31 the web 16 is forced to bypass the perpendicular distance between the ribs 15, the ribs being pressed apart until a firm wedgelike engagement is achieved between the end portions 14,24 that are complementarily shaped and dimensioned to accommodate their respective tabs and recesses.

Figure 4:
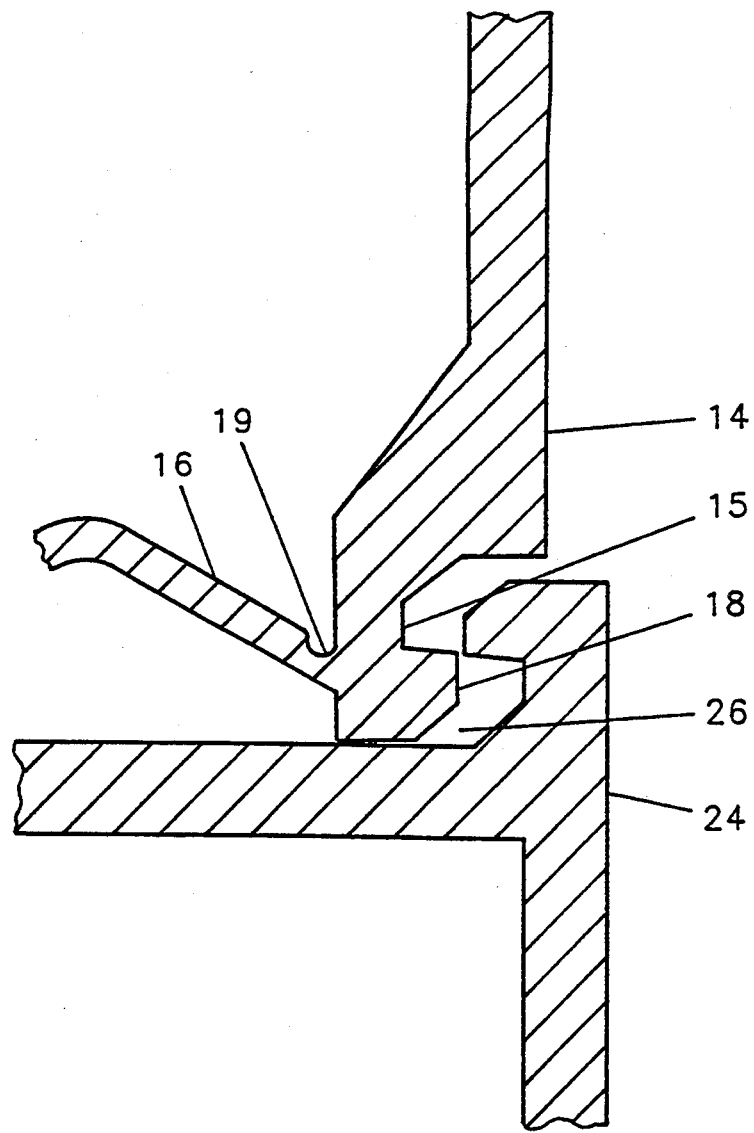
FIG. 4 shows in enlarged cross-sectional view details of a joint area.

As shown in an enlarged cross-sectional view of the joint area in FIG. 4, this particular way of deforming the web 16, employing the first structural member 1 as a dolly, results in a very lenient joining method. No significant friction forces causing distortion (deformation) of the lateral walls of the slot 26 and consequently weakening of the joint are created between the surfaces of the joined edge portions 14,24 of the structural members until a wedge frictional locking is achieved at maximum extension of the deformed web 16.

The web 16 is further optionally provided at its opposite lateral edges with longitudinally extending grooves 19 to ensure a complete control of the deformation process. The resulting superior strong joint is thus not primarily based on the inherent resilient back pressure from the ribs 15, but on the locking pressure exhibited by the permanently deformed web 16. Measurements of stretch strength conducted on a load bearing structure resulting from joining of profile members according to the above method show that actual burst (rupture) occurs outside of the joints.

Figure 5:
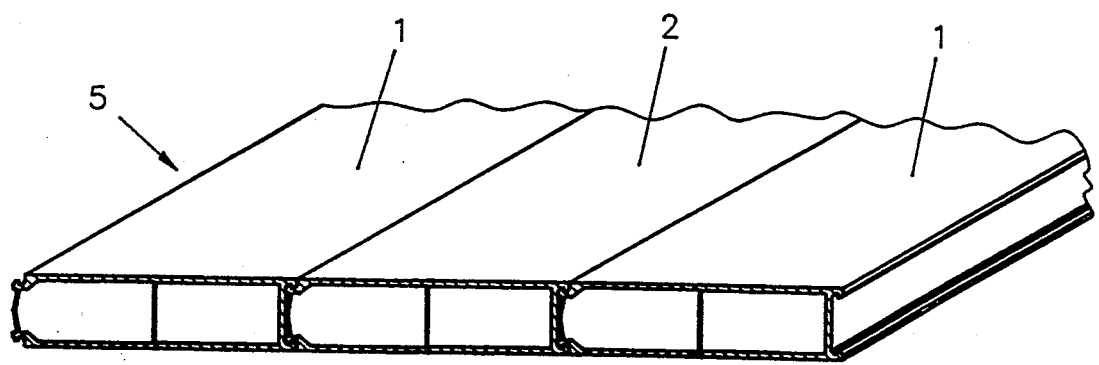
FIG. 5 shows a structural unit comprising a plurality of joined members.

Such bearing structure unit embodied as a floor structure 5, e.g. for a vehicle, is shown in FIG. 5. A plurality of profile members 1,2 being connected and interlocked according to the above described principle extend, e.g., between two side profile members having a cross-sectional configuration adapted to the purpose/function of the actual structural unit (not shown in the Figure).

The above described deformation tool is advantageously employed as handling means for the structural members, something which simplifies significantly the assembling of the members.

The scope of the present invention is not limited to the illustrated and described specific embodiments. Modifications may be made to the invention without departing from its spirit. Thus, e.g. the transverse web could have an arcuate configuration instead of the shown folded V-like shape, and the elongated basic profile member can be provided with a central portion constituted by a single wall instead of the shown hollow shapes. Rolling means, instead of the shown mandrel 31, can also be used as deformation tool 3.

We claim:

1. A method of joining structural members, said method comprising the steps of:
   providing a first member having an edge portion comprising two substantially parallelly extending ribs provided outwardly with respective laterally undercut recesses and adjacent projecting tabs, said tabs being interconnected by a unitary transversely extending inwardly arcuate web,
   providing a second member having an edge portion of transverse cross-sectional configuration complementarily shaped with locking tabs projecting into a slot defined by a transverse wall and opposite lateral side walls to engage said ribs of said first member,
   inserting said ribs into said slot, and
   permanently deforming said arcuate web by depressing said web to be flush with or below a transverse plane between opposite lateral edges of said web by means of a deformation tool employing said first member itself as a dolly, and thus forcing said outwardly projecting tabs laterally into a wedged frictional engagement with said slot of said second member.

2. The method according to claim 1, where said deformation tool is a mandrel employed as handling means during assembling of said members.

3. A load bearing structure unit comprising a plurality of profile members being joined and interlocked according to claim 1.

4. A profile member having a transverse cross-section comprising a central portion and edge portions, where at least one of said edge portions is provided with two substantially parallelly extending ribs having outwardly laterally projecting tabs and adjacent undercut recesses, said tabs being interconnected by a unitary transversely extending and inwardly arcuate web.

5. The member according to claim 4, where said arcuate web has a wall thickness smaller than the wall thickness of said ribs, and said web is further provided at opposite lateral edges thereof with longitudinally extending grooves.

6. The member according to claim 5, where the member is an extruded hollow shape.

7. The member according to claim 4, where a member is an extruded hollow shape.

* * * * *